United States Patent [19]
Keech et al.

[11] Patent Number: 5,576,128
[45] Date of Patent: Nov. 19, 1996

[54] COLOR NEGATIVE FILMS WITH LOW MID-SCALE CONTRAST FOR TELECINE TRANSFER APPLICATIONS

[75] Inventors: John T. Keech, Penfield; John C. Brewer, Rochester, both of N.Y.

[73] Assignee: Eastman Kodak Company, Rochester, N.Y.

[21] Appl. No.: 350,203

[22] Filed: Dec. 5, 1994

[51] Int. Cl.$^6$ ............................ G03C 1/46; G03C 7/22
[52] U.S. Cl. ................ 430/21; 430/502; 430/504; 430/505; 430/506; 430/508; 430/509; 430/503; 430/359; 430/383
[58] Field of Search ..................... 430/502, 503, 430/504, 505, 506, 508, 509, 21, 359, 383

[56] References Cited

U.S. PATENT DOCUMENTS

| | | | |
|---|---|---|---|
| 3,740,457 | 6/1973 | Meeussen et al. | 178/5.4 CD |
| 3,849,138 | 11/1974 | Wyckoff | 96/74 |
| 4,161,406 | 7/1979 | Bulloch | 96/55 |
| 4,680,253 | 7/1987 | Shibahara et al. | 430/504 |
| 4,792,518 | 12/1988 | Kuwashima et al. | 430/505 |
| 5,108,881 | 4/1992 | Dickerson et al. | 430/502 |
| 5,266,451 | 11/1993 | Schmuck et al. | 430/509 |
| 5,268,251 | 12/1993 | Sakuma | 430/502 |
| 5,300,381 | 4/1994 | Buhr et al. | 430/30 |
| 5,314,793 | 5/1994 | Chang et al. | 430/505 |
| 5,360,703 | 11/1994 | Chang et al. | 430/506 |
| 5,390,036 | 2/1995 | Buhr et al. | 358/519 |
| 5,391,443 | 2/1995 | Simons et al. | 430/21 |

FOREIGN PATENT DOCUMENTS

| | | |
|---|---|---|
| 324471 | 7/1989 | European Pat. Off. |
| 684511 | 11/1995 | European Pat. Off. |

OTHER PUBLICATIONS

*The Negative* by Ansel Adams, New York Graphic Society, Boston, MA USA (1981), Chapter 4, "The Zone System", pp. 47–98.

AGFA XT100, XT125, XTR250, and XT320 Colour Negative Films Technical Data Sheets (16 pages).

Paul Collard, "The Film/Tape Interface", Image Technology, May 1988, pp. 149–154.

*Primary Examiner*—Geraldine Letscher
*Attorney, Agent, or Firm*—Andrew J. Anderson

[57] ABSTRACT

A color negative photographic film with at least one color record thereof having a mid-scale contrast less than or equal to 0.45, wherein the mid-scale contrast for the color record is defined as the slope of a straight line connecting a point C and and a point D on the characteristic curve of density versus log Exposure for the color record, where points C and D are located by defining a point A on the characteristic curve at a density level 0.1 above minimum density, a point B is located on the characteristic curve at an exposure value +1.0 Log Exposure beyond point A, and points C and D are located at exposure values −0.45 log Exposure and +0.45 log Exposure with respect to point B, respectively. Use of such a color negative film is particularly advantageous in making telecine transfers.

18 Claims, 1 Drawing Sheet

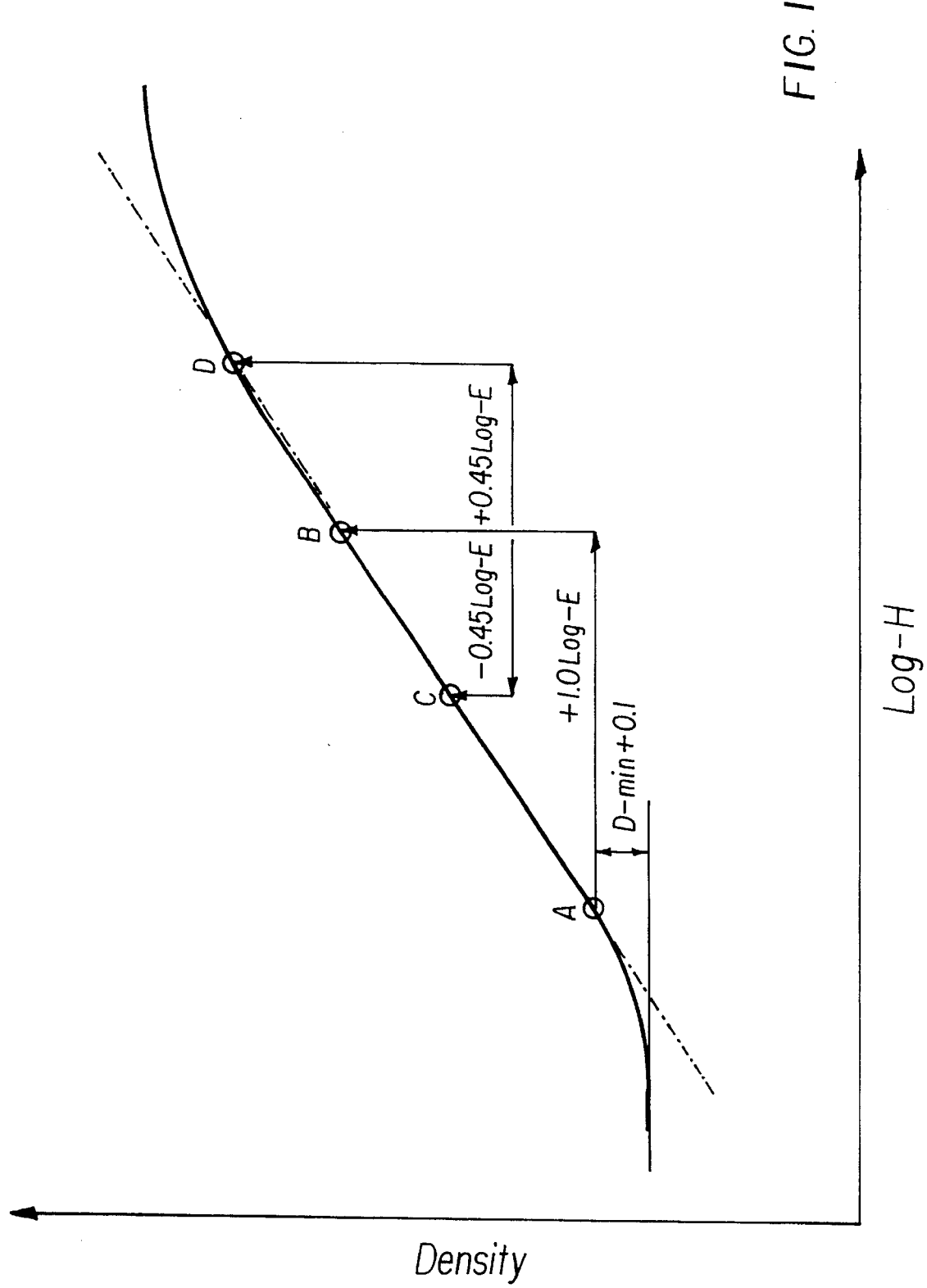

COLOR NEGATIVE FILMS WITH LOW MID-SCALE CONTRAST FOR TELECINE TRANSFER APPLICATIONS

FIELD OF THE INVENTION

The invention relates to a color negative film, and more particularly to a motion picture color negative film which has low mid-scale contrast.

BACKGROUND

Color negative films are a class of photosensitive materials that map the luminance (neutral) and chrominance (color) information of a scene to complementary tonal and hue polarities in the negative film. Light areas of the scene are recorded as dark areas on the color negative film, and dark areas of the scene are recorded as light areas on the color negative film. Colored areas of the scene are recorded as complementary colors in the color negative film: red is recorded as cyan, green is recorded as magenta, blue is recorded as yellow, etc. In order to render an accurate reproduction of a scene, a subsequent process is necessary to reverse the luminance and chrominance information back to those of the original scene. This subsequent process may or may not require another photosensitive material.

In the motion picture industry, there are two common subsequent processes. One such subsequent process is to optically print the color negative film onto another photosensitive material, such as Eastman Color Print Film 5386™, to produce a color positive image suitable for projection. Another subsequent process in the motion picture industry is to transfer the color negative film information or the color print film information into a video signal using a telecine transfer device. Various types of telecine transfer devices are described in *Engineering Handbook*, E. O. Fritts, Ed., 8th edition, National Association of Broadcasters, 1992, Chapter 5.8, pp. 933–946, the disclosure of which is incorporated by reference. The most popular of such devices generally employ either a flying spot scanner using photomultiplier tube detectors, or arrays of charged-coupled devices, also called CCD sensors. Telecine devices scan each negative or positive film frame transforming the transmittance at each pixel of an image into voltage. The signal processing then inverts the electrical signal in the case of a transfer made from a negative film in order to render a positive image. The signal is carefully amplified and modulated, and fed into a cathode ray tube monitor to display the image, or recorded onto magnetic tape for storage.

In the motion picture industry, the same color negative films are conventionally used for both subsequent processes, optical printing and telecine transfer to a video signal. In order to obtain a high quality visual image in an optical print, the mid-scale contrast (MSC) for each color record of the negative film is conventionally maintained equal to about 0.45 or higher, with higher levels being preferred for two or more records. Reduction of the contrast below this level in a negative would result in the production of flat-looking images in a positive print with black tones rendered as smokey-grey and white tones rendered as light gray. Pictures such as these would not be pleasing to view and would be deemed to be of low quality in the industry.

Images captured in a conventional color negative film designed for optical printing, however, can exhibit a loss of detail in highlights of high dynamic range scenes upon being processed with a telecine transfer device. Additionally, many telecine devices use light sources that are deficient in blue light output. Conventional negative films, which have relatively high blue minimum densities resulting from the presence of materials designed to improve the image quality of an optical print, can be difficult to scan on these telecine devices, and may exhibit excessive blue channel noise in a telecine transfer. These effects reduce the image quality obtainable in a telecine transfer, and can make the process of transferring film to video using a telecine device difficult and time-consuming. Loss in highlight detail in a telecine transfer is commonly caused by 'burn-out' (high densities of a color negative film mapped to higher voltages than can be displayed on cathode ray monitors). Excessive 'burn-out' makes film-to-video transfers difficult and time consuming.

While color print films have been designed specifically for use in making positives for telecine transferring, use of such print films adds additional processing steps and costs to forming a telecine transfer, and image information from the color negative can be lost in the print step. Accordingly, it would be desirable to make improved telecine transfers possible directly from a color negative film.

SUMMARY OF THE INVENTION

One embodiment of the invention comprises an unexposed color negative photographic film comprising red, green and blue color sensitive records, wherein at least one of the color records has a mid-scale contrast less than or equal to 0.45, wherein the mid-scale contrast for a color record is defined as the slope of a straight line connecting a point $\underline{C}$ and and a point $\underline{D}$ on the characteristic curve of Status M density versus log Exposure for the color record, where points $\underline{C}$ and $\underline{D}$ are located by defining a point $\underline{A}$ on the characteristic curve at a density level 0.1 above minimum density, a point $\underline{B}$ is located on the characteristic curve at an exposure value +1.0 Log Exposure beyond point $\underline{A}$, and points $\underline{C}$ and $\underline{D}$ are located at exposure values −0.45 log Exposure and +0.45 log Exposure with respect to point $\underline{B}$, respectively.

A further embodiment of the invention comprises a process of forming a telecine transfer image comprising exposing a film as described in the above embodiment, processing the exposed film to form a developed image, and converting the developed image into video signals representative of the developed image with a telecine transfer device, wherein the contrast of the video signals representative of the color record of the image having a mid-scale contrast less than or equal to 0.45 is raised in the telecine transfer device.

We have found that color negative films with mid-scale contrast (MSC) values below the typical contrast limitations of optically printable films can be used in a telecine device and show benefits not available with optically printable color negative films. We have found that color negative films with MSC values of one or more color records less than 0.45, and more preferably equal to or less than 0.40, produce especially pleasing images in telecine transfers compared to films with higher MSC values. It is preferred that the blue color record have a MSC value less than 0.45. It is further preferred to have two or more color records with MSC values less than 0.45, and it is most preferred to have three or more color records with MSC values less than 0.45.

These films with low MSC values have unexpected benefits, including reduced blue minimum densities, reduced sensitivity to radiation damage, and improved reproduction of highlights in telecine transfer applications. Reduced blue minimum densities are desired by the motion picture industry because of limited blue light sources on some telecine devices. Reduced susceptibility to radiation damage is desired because radiation increases densities and image noise, particularly in the blue channel. Additionally, films with low MSC values may have additional benefits resulting from the formulation changes used to achieve the low MSC values. These benefits include higher color saturation, more accurate color hue, higher sharpness, and reduced granularity.

DESCRIPTION OF THE DRAWING

FIG. 1 is a characteristic curve of density versus log E for a color negative film in accordance with the invention.

DETAILED DESCRIPTION OF THE INVENTION

We have found that by designing films with mid-scale contrast (MSC) values below the typical lower limitations of optically printable color negative films, but that are correctable in a telecine device, we obtain benefits not available using typical higher contrast color negative films. Some of these benefits are unexpected, such as reduced blue minimum densities, reduced susceptibility to radiation damage, and improved reproduction of highlights. Other improvements are made possible by the film formulations necessary to generate color negative films with MSC values equal to or less than 0.45, such as higher color saturation, more accurate color hue, higher sharpness, and reduced granularity.

MSC is depicted in FIG. 1 and is defined as follows. From point $\underline{A}$ at a Status M density level 0.1 above the minimum density, define point $\underline{B}$ at an exposure value +1.0 Log-E beyond $\underline{A}$. Define points $\underline{C}$ and $\underline{D}$ that are located at exposure values −0.45 and +0.45 Log-E vs. point $\underline{B}$, respectively. The MSC is the slope of the line that intersect points $\underline{C}$ and $\underline{D}$.

In constucting films according to the invention, the required parameters can be achieved by various techniques, examples of which are described below. These techniques are preferably applied to each color record of a silver halide photographic element so that all color records will meet the requirements of the present invention. For example, the reduced contrast position exhibited in films according to the the invention may be accomplished by any combination of formulations changes such as reductions in laydowns of silver or image coupler, blend ratio changes of high and low speed emulsions, increased laydowns of image modifying chemistry such as development inhibitor releasing (DIR) or development inhibitor anchimeric releasing (DIAR) couplers, and blend ratio changes of more-active and less-active image couplers. All of these film design tools are well known in the art.

Reduced blue minimum densities are possible as a result of formulating a film for reduced contrast levels, particularly because of the lower emulsion fog density that is generated. The minimum density of a color record is the sum of the emulsion fog density and the colored coupler density, or CCD. The fog density is generated by unexposed silver halide grains that develop dye during processing. The CCD results from any material that has some colored density without development, such as unreacted masking couplers, base, retained non-imaging dyes, retained sensitizing dyes, etc. The CCD level may be reduced by removing or lowering, where possible, the amount used of those compounds which contribute to the CCD. We have found that by also reducing the MSC of the blue record, the record is less capable of generating fog density. With both fog and CCD contributions to minimum density being decreased, the total minimum density is further decreased. This is a factor for a reduced contrast blue record only. Films with low blue densities are preferred for film-to-video transfers because the light sources of many telecine devices are deficient in blue light output. Hence, reducing the minimum blue densities serve to increase the blue light throughput of the telecine device, which makes film scanning easier and may lead to reduced blue channel noise on certain telecine devices.

We have also found that the susceptibility of the blue record to radiation damage is lower for films with low MSC values compared to higher contrast color negative films. This is due to the same factors that lead to reduced blue minimum densities for these types of films. Radiation exposure increases blue minimum densities and increases blue record granularity, leading to higher noise in the film-to-video transfers. This is a factor for a reduced contrast blue record only.

Improved reproduction of highlights is attained with films with reduced MSC levels. This is observed in images recorded on reduced contrast films and is a factor for reduced-contrast red, green, and blue records. Highlights in film-to-video transfers of high contrast scenes (500:1) were observed to have more detail when originated on film samples with reduced MSC values compared to images originated on typical higher contrast color negative films. This is due to how the electronic signal processing of the telecine transfer device adjusts the contrast of images originated on film samples with reduced MSC values compared to images originated on higher contrast color negative films.

Additionally, some characteristics of color negative films that are optimized to improve the quality of optical prints also improve the quality of the video images obtained using a telecine transfer device, and it is desirable to incorporate such characteristics into the color negative filme of the invention. These characteristics include, e.g., high color saturation, accurate color hue, high Modulation Transfer Function (MTF), and low granularity.

Higher color saturation and more accurate color hues can be achieved as a result of the particular method employed in formulating a film with reduced MSC levels. One method employed to reduce the contrast is reduction of image coupler laydowns. With the masking coupler levels fixed, this increases the fraction of masking coupler to image coupler, which leads to greater color saturation. Another method employed to reduce the contrast is to reduce the silver levels. With the levels of image modifying couplers such as DIR and DIAR couplers fixed, this raises the fraction of image modifying coupler to silver ratio, which leads to greater color saturation. Finally, increased levels of DIR and/or DIAR image modifying couplers can also be used to reduce the contrast, and these chemicals are well known to increase the color saturation of the resulting film. This is a factor for reduced contrast red, green, and blue records. Particular increases in blue, red, and yellow saturation, and improved accuracy in magenta hue reproduction have been achieved in film-to-video transfers of images originated on film samples with reduced MSC values.

Higher sharpness is possible as a result of formulating a film with reduced MSC levels. The reduced image coupler laydowns yield thinner films, which in turn exhibit higher MTF values compared to thicker films. Reduced silver halide laydowns reduces the light scatter within the film, which also increases the MTF values. Finally, increased levels of DIR and/or DIAR image modifying couplers can also be used to achieve higher MTF values. This is a factor for reduced contrast red, green, and blue records.

Lower granularity results by formulating a film with reduced MSC levels. Reduced densities have been shown to produce reduced granularity levels (*The Theory of the Photographic Process*, 4th ed.; T. H. James Ed.; Macmillan Publishing Co., New York, N.Y., 1977; Ch 21, p 625, eq 21.101). It follows that reduced contrast produces reduced densities. This is a factor for reduced contrast red, green, and blue records.

In addition to improved film performance in film-to-video transfers, the film samples with reduced MSC value generally have lower image coupler and silver laydowns compared to conventional contrast color negative films. This leads to reduced manufacturing costs, which is advantageous.

As already described, the photographic elements of the present invention are color elements and contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In a alternative, less preferred, format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. Each of the cyan, magenta, and yellow image forming units may be comprised of a single light-sensitive layer, a pack of two light-sensitive layers with one being more light sensitive and the other being less light-sensitive, or a pack or three or more light-sensitive layers of varying light-sensitivity. These layers can be combined in any order depending upon the specific features designed in the photographic element. The element can contain additional layers, such as filter layers, interlayers, overcoat layers, subbing layers, and the like.

In the following discussion of suitable materials for use in elements of this invention, reference will be made to *Research Disclosure*, December 1989, Item 308119, published by Kenneth Mason Publications, Ltd., Dudley Annex, 12a North Street, Emsworth, Hampshire P010 7DQ, ENGLAND, which will be identified hereafter by the term "Research Disclosure I." The Sections hereafter referred to are Sections of the Research Disclosure I.

The silver halide emulsions employed in the elements of this invention will be negative-working emulsions. Suitable emulsions and their preparation as well as methods of chemical and spectral sensitization are described in Sections I through IV. Color materials and development modifiers are described in Sections V and XXI. Vehicles which can be used in the elements of the present invention are described in Section IX, and various additives such as brighteners, antifoggants, stabilizers, light absorbing and scattering materials, hardeners, coating aids, plasticizers, lubricants and matting agents are described, for example, in Sections V, VI, VIII, X, XI, XII, and XVI. Manufacturing methods are described in Sections XIV and XV, other layers and supports in Sections XIII and XVII, and exposure alternatives in Section XVIII.

The photographic elements of the present invention may also use colored couplers (e.g. to adjust levels of interlayer correction) and masking couplers such as those described in EP 213.490; Japanese Published Application 58-172,647; U.S. Pat. No. 2,983,608; German Application DE 2,706, 117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps, for example, of bleaching or fixing to improve the quality of the image. Bleach accelerators described in EP 193,389; EP 301,477; U.S. Pat. Nos. 4,163,669; 4,865,956; and 4,923, 784 are particularly useful. Also contemplated is the use of nucleating agents, development accelerators or their precursors (UK Patent 2,097,140; U.K. Patent 2,131,188); electron transfer agents (U.S. Pat. Nos. 4,859,578; 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The elements may also contain filter dye layers comprising colloidal silver sol or yellow and/or magenta filter dyes, either as oil-in-water dispersions, latex dispersions or as solid particle dispersions. Additionally, they may be used with "smearing" couplers (e.g. as described in U.S. Pat. No. 4,366,237; EP 96,570; U.S. Pat. Nos. 4,420,556; and 4,543, 323.) Also, the couplers may be blocked or coated in protected form as described, for example, in Japanese Application 61/258,249 or U.S. Pat. No. 5,019,492.

The photographic elements may further contain image-modifying compounds such as "Developer Inhibitor-Releasing" compounds (DIR's). Useful DIR's for elements of the present invention, are known in the art and examples are described in U.S. Pat. Nos. 3,137,578; 3,148,022; 3,148, 062; 3,227,554; 3,384,657; 3,379,529; 3,615,506; 3,617, 291; 3,620,746; 3,701,783; 3,733,201; 4,049,455; 4,095, 984; 4,126,459; 4,149,886; 4,150,228; 4,211,562; 4,248, 962; 4,259,437; 4,362,878; 4,409,323; 4,477,563; 4,782, 012; 4,962,018; 4,500,634; 4,579,816; 4,607,004; 4,618, 571; 4,678,739; 4,746,600; 4,746,601; 4,791,049; 4,857, 447; 4,865,959; 4,880,342; 4,886,736; 4,937,179; 4,946, 767; 4,948,716; 4,952,485; 4,956,269; 4,959,299; 4,966, 835; 4,985,336 as well as in patent publications GB 1,560, 240; GB 2,007,662; GB 2,032,914; GB 2,099,167; DE 2,842,063, DE 2,937,127; DE 3,636,824; DE 3,644,416 as well as the following European Patent Publications: 272, 573; 335,319; 36,411; 346, 899; 362, 870; 365,252; 365, 346; 373,382; 76,212; 377,463; 378,236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in *Photographic Science and Engineering*, Vol. 13, p. 174 (1969), incorporated herein by reference.

The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat. Nos. 4,346,165; 4,540,653 and 4,906, 559); with ballasted chelating agents such as those in U.S.

Pat. No. 4,994,359 to reduce sensitivity to polyvalent cations such as calcium; and with stain reducing compounds such as described in U.S. Pat. Nos. 5,068,171 and 5,096,805. Other compounds useful in the elements of the invention are disclosed in Japanese Published Applications 83-09,959; 83-62,586; 90-072,629, 90-072,630; 90-072,632; 90-072, 633; 90-072,634; 90-077,822; 90-078,229; 90-078,230; 90-079,336; 90-079,338; 90-079,690; 90-079,691; 90-080, 487; 90-080,489; 90-080,490; 90-080,491; 90-080,492; 90-080,494; 90-085,928; 90-086,669; 90-086,670; 90-087, 361; 90-087,362; 90-087,363; 90-087,364; 90-088,096; 90-088,097; 90-093,662; 90-093,663; 90-093,664; 90-093, 665; 90-093,666; 90-093,668; 90-094,055; 90-094,056; 90-101,937; 90-103,409; 90-151,577.

The silver halide used in the photographic elements of the present invention may be silver bromoiodide, silver bromide, silver chloride, silver chlorobromide, silver chlorobromo-iodide, and the like. The type of silver halide grains preferably include polymorphic, cubic, and octahedral. The grain size of the silver halide may have any distribution known to be useful in photographic compositions, and may be ether polydipersed or monodispersed. Particularly useful in this invention are tabular grain silver halide emulsions. Specifically contemplated tabular grain emulsions are those in which greater than 50 percent of the total projected area of the emulsion grains are accounted for by tabular grains having a thickness of less than 0.3 micron (0.5 micron for blue sensitive emulsion) and an average tabularity (T) of greater than 25 (preferably greater than 100), where the term "tabularity" is employed in its art recognized usage as $$T = ECD/t^2$$

where

ECD is the average equivalent circular diameter of the tabular grains in microns and t is the average thickness in microns of the tabular grains.

The average useful ECD of photographic emulsions can range up to about 10 microns, although in practice emulsion ECD's seldom exceed about 4 microns. Since both photographic speed and granularity increase with increasing ECD's, it is generally preferred to employ the smallest tabular grain ECD's compatible with achieving aim speed requirements.

Emulsion tabularity increases markedly with reductions in tabular grain thickness. It is generally preferred that aim tabular grain projected areas be satisfied by thin (t<0.2 micron) tabular grains. Tabular grain thicknesses typically range down to about 0.02 micron. However, still lower tabular grain thicknesses are contemplated. For example, Daubendiek et al U.S. Pat. No. 4,672,027 reports a 3 mole percent iodide tabular grain silver bromoiodide emulsion having a grain thickness of 0.017 micron.

As noted above tabular grains of less than the specified thickness account for at least 50 percent of the total grain projected area of the emulsion. To maximize the advantages of high tabularity it is generally preferred that tabular grains satisfying the stated thickness criterion account for the highest conveniently attainable percentage of the total grain projected area of the emulsion. For example, in preferred emulsions tabular grains satisfying the stated thickness criteria above account for at least 70 percent of the total grain projected area. In the highest performance tabular grain emulsions tabular grains satisfying the thickness criteria above account for at least 90 percent of total grain projected area.

Suitable tabular grain emulsions can be selected from among a variety of conventional teachings, such as those of the following: *Research Disclosure*, Item 22534, January 1983, published by Kenneth Mason Publications, Ltd., Emsworth, Hampshire PO10 7DD, England; U.S. Pat. Nos. 4,439,520; 4,414,310; 4,433,048; 4,643,966; 4,647,528; 4,665,012; 4,672,027; 4,678,745; 4,693,964; 4,713,320; 4,722,886; 4,755,456; 4,775,617; 4,797,354; 4,801,522; 4,806,461; 4,835,095; 4,853,322; 4,914,014; 4,962,015; 4,985,350; 5,061,069 and 5,061,616.

The silver halide grains to be used in the invention may be prepared according to methods known in the art, such as those described in *Research Disclosure I* and James, *The Theory of the Photographic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in *Research Disclosure*, June 1975, item 13452 and U.S. Pat. No. 3,772,031.

The silver halide may be sensitized by sensitizing dyes by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (for example, 2 hours).

Photographic elements of the present invention may also usefully include a magnetic recording material as described in *Research Disclosure*, Item 34390, November 1992.

Photographic elements of the present invention are motion picture film elements. Such elements typically have a width of up to 100 millimeters (or only up to 70 or 50 millimeters), and a length of at least 30 meters (or optionally at least 100 or 200 meters). The manufactured elements are provided to a user with a speed value of the film indicated on the film or its packaging.

The elements of the present invention may be imagewise exposed with a normal exposure according to the speed value indicated with the film or other manufacturer recommendations, and processed according to the processing conditions indicated on the film or its packaging. This is advantageous in that the film user need not experiment with various under-development conditions or flashing conditions in order to obtain a desired contrast position. The film of the present invention is preferably simply exposed and processed according to the manufacturer's indications without flashing, and the advantages of the film are obtained. These alternative processing techniques, however, can also be used with films according to the invention if desired.

By "indicated" in relation to the film speed and processing conditions, means that some designation is provided on the film or its packaging or associated with one or the other, which allows the user to ascertain the manufacturer's speed rating (or film processing conditions). Such a designation can be a film speed number (such as Film Speed, or ASA Film Speed), or in the case of processing conditions, an actual statement of the conditions or reference to a well-known standard processing method (for example, Kodak ECN-2 processing). Alternatively, such a designation can be a film identification designation (such as a number or film name) which allows a user to match the film with the manufacturer's speed designation or processing conditions (such as from a catalogue, brochure or other source).

The following examples illustrate preparation of photographic elements of the present invention, and their beneficial characteristics.

EXAMPLE 1

The following layers were coated on a transparent base to make film samples 1A through 1D, as described in Table 1. Emulsions are described in Table 2. Chemical structures of couplers and dyes are listed thereafter.

TABLE 1

Formulation Description (Units in mg/m$^2$)

| | Samples | | | |
|---|---|---|---|---|
| | 1A | 1B | 1C | 1D |
| Layer 1 | | | | |
| Slow Cyan Emulsion | 468.4 | 468.4 | 460 | 472 |
| Mid Cyan Emulsion | 1093 | 1093 | 1101 | 1089 |
| Coupler-1 | 312 | 312 | 171 | 162 |
| Coupler-2 | 17 | 17 | 40 | 48 |
| Coupler-3 | 65 | 65 | 65 | 65 |
| Coupler-4 | 25 | 25 | 25 | 25 |
| Coupler-5 | 27 | 27 | 27 | 27 |
| Gelatin | 2535 | 2535 | 2535 | 2535 |
| Layer 2 | | | | |
| Fast Cyan Emulsion | 1100 | 1100 | 1100 | 1100 |
| Coupler-1 | 77.4 | 77.4 | 5.7 | 4.7 |
| Coupler-5 | 27.0 | 27.0 | 27.0 | 27.0 |
| Gelatin | 1347 | 1347 | 1347 | 1347 |
| Layer 3 | | | | |
| Coupler-6 | 18 | 0.0 | 0.0 | 0.0 |
| Didodecylhydroquinone | 108 | 108 | 108 | 108 |
| Gelatin | 646 | 646 | 646 | 646 |
| Layer 4 | | | | |
| Slow Magenta Emulsion | 990 | 990 | 1736 | 2040 |
| Mid Magenta Emulsion | 1483 | 1483 | 738 | 433 |
| Coupler-7 | 420 | 420 | 331 | 358 |
| Coupler-1 | 43 | 43 | 0 | 0 |
| Coupler-8 | 144 | 144 | 144 | 144 |
| Coupler-9 | 31 | 31 | 40 | 42.5 |
| Gelatin | 2277 | 2277 | 2277 | 2277 |
| Layer 5 | | | | |
| Fast Magenta Emulsion | 1119 | 1119 | 1035 | 993 |
| Coupler-8 | 21.5 | 21.5 | 21.5 | 21.5 |
| Coupler-10 | 81 | 81 | 30 | 41 |
| Coupler-7 | 18.4 | 18.4 | 18.4 | 18.4 |
| Gelatin | 1290 | 1290 | 1290 | 1290 |
| Layer 6 | | | | |
| Coupler-6 | 18.3 | 0.0 | 0.0 | 0.0 |
| Didodecylhydroquinone | 110 | 110 | 110 | 110 |
| Dye-1 | 151.0 | 194 | 194 | 194 |
| Gelatin | 646 | 646 | 646 | 646 |
| Layer 7 | | | | |
| Slow Yellow Emulsion | 255 | 255 | 171 | 123 |
| Mid Yellow Emulsion | 595 | 595 | 594 | 601 |
| Coupler-11 | 27 | 27 | 27 | 27 |
| Coupler-12 | 480 | 480 | 690 | 631 |
| Coupler-13 } | 320 | 320 | 13 | 0.0 |
| Gelatin | 1700 | 1700 | 1700 | 1700 |
| Layer 8 | | | | |
| Fast Yellow Emulsion | 1614.5 | 1614.5 | 1267 | 1360 |
| Coupler-13 | 320 | 320 | 242 | 259 |
| Gelatin | 1641 | 1641 | 1641 | 1641 |

Surfactants were added as coating aids where appropriate as in commonly done in the art. An ultraviolet absorbing layer and a protective overcoat layer were coated over Layer 8.

TABLE 2

Emulsion Descriptions.

| Emulsion | Structure | Iodide % | Diameter | Thickness |
|---|---|---|---|---|
| Slow Cyan | Tabular | 2.3% | 0.98 μm | 0.114 μm |
| Mid Cyan | Tabular | 4% | 1.90 μm | 0.125 μm |
| Fast Cyan | Tabular | 5% | 3.50 μm | 0.130 μm |
| Slow Magenta | Tabular | 4% | 0.70 μm | 0.101 μm |
| Mid Magenta | Tabular | 4% | 1.80 μm | 0.130 μm |

TABLE 2-continued
Emulsion Descriptions.
| | | | | |
|---|---|---|---|---|
| Fast Magenta | Tabular | 4% | 4.00 μm | 0.118 μm |
| Slow Yellow | Tabular | 3% | 1.65 μm | 0.120 μm |
| Mid Yellow | Tabular | 5% | 2.60 μm | 0.120 μm |
| Fast Yellow | 3-D | 9% | 2.00 μm | — |
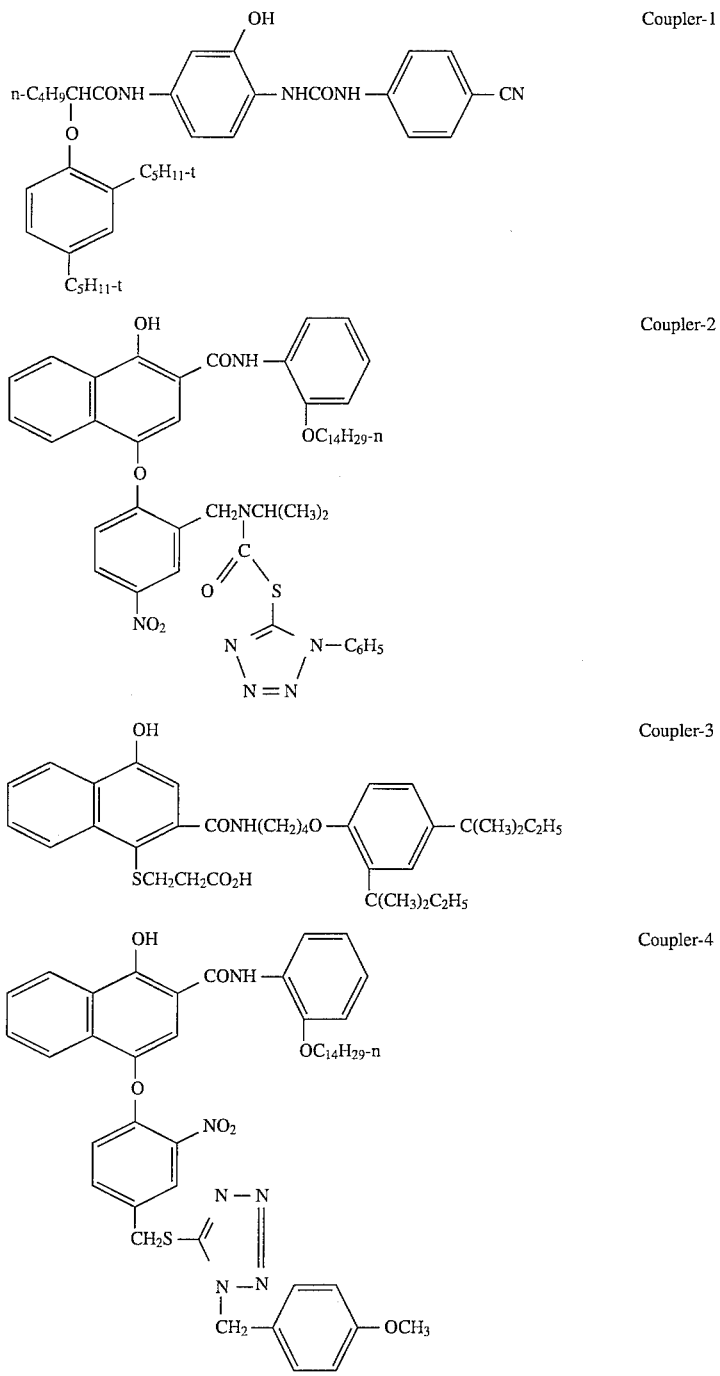
Coupler-1
Coupler-2
Coupler-3
Coupler-4

TABLE 2-continued
Emulsion Descriptions.
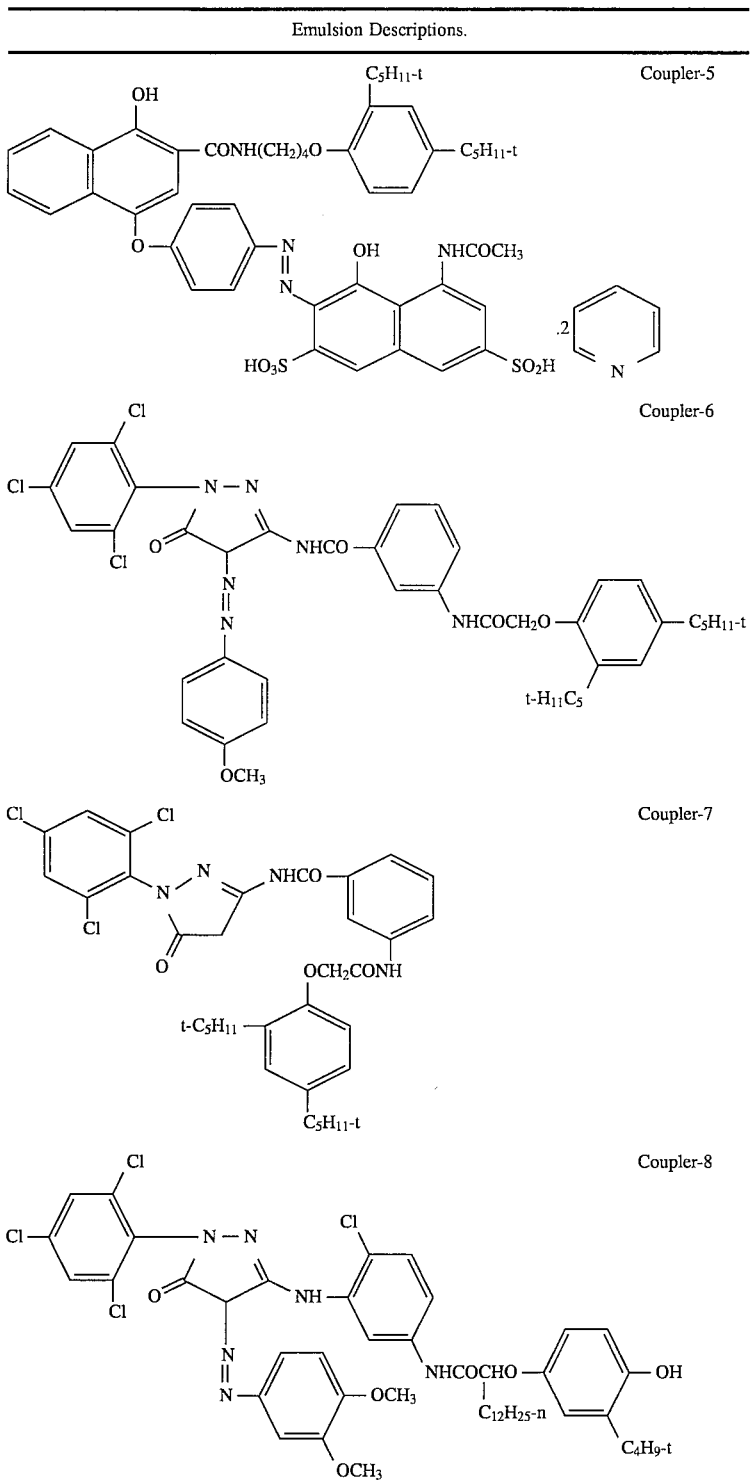

TABLE 2-continued
Emulsion Descriptions.
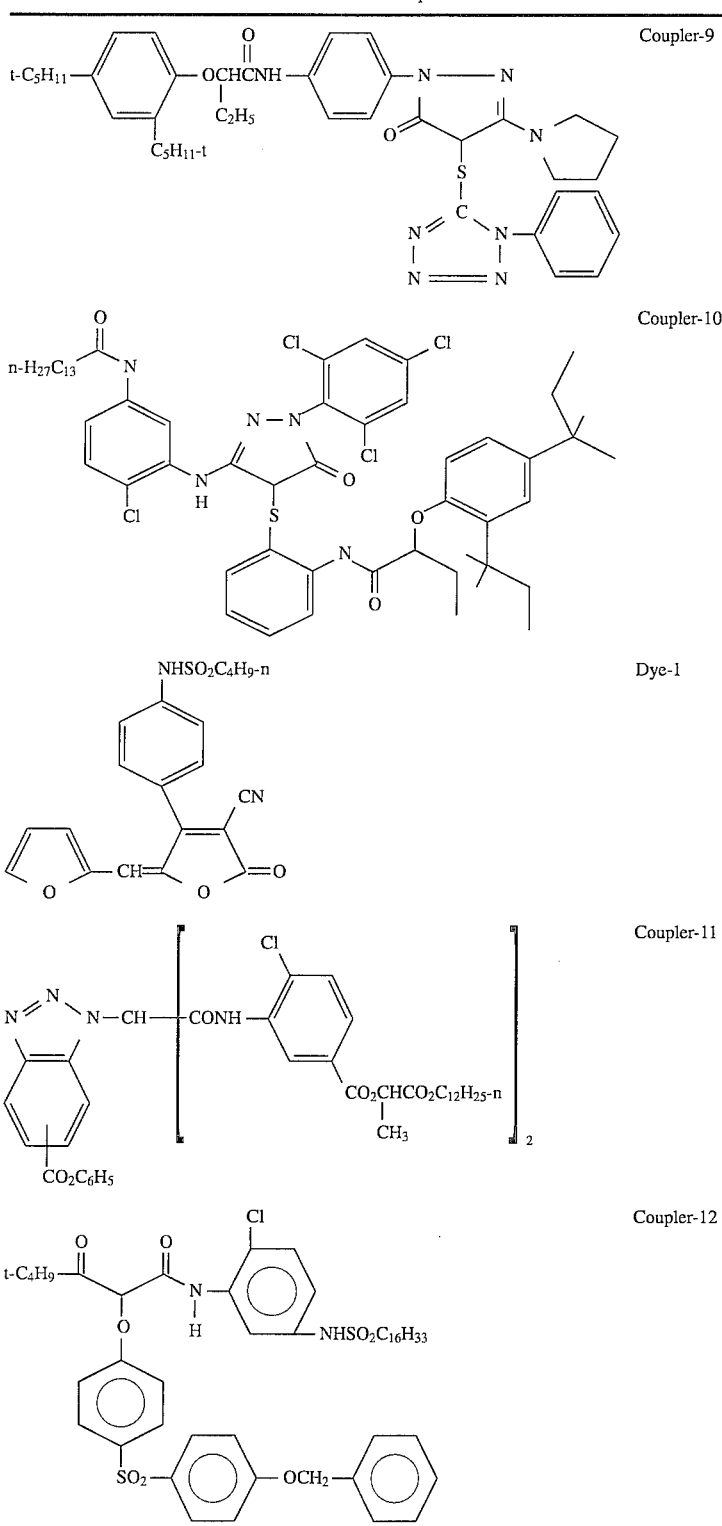

TABLE 2-continued

Emulsion Descriptions.

Coupler-13: a compound with t-$C_4H_9$, carbonyl groups, an O-linked phenyl-$SO_2$-phenyl-OH substituent, and an N-H linked 2-Cl-phenyl bearing $NHSO_2C_{16}H_{33}$.

The above films were exposed on a Kodak 1B sensitometer with a 3200K light balance. Exposures were adjusted so that a minimum of 0.20 log-E of minimum density resulted on the strips when processed according to Process A below. Duplicate strips were exposed, and then one strip each was processed through Processes A and B described in Table 3 below. Process A is the Kodak ECN-2 Process, a complete description of which is contained in the Kodak H-24 Manual (*Manual for Processing Eastman Motion Picture Films*; H-24 Manual; Eastman Kodak Company, Rochester, N.Y.).

TABLE 3

Description of Process A and Process B.

| Solution | Process A Time (sec) | Process B Time (sec) |
|---|---|---|
| Pre-Bath | 10 | 10 |
| Remjet Removal | 20 | 20 |
| Developer | 180 | none |
| Stop Bath | 30 | none |
| Wash | 30 | 30 |
| UL Bleach | 180 | 180 |
| Wash | 60 | 60 |
| Fix | 120 | 120 |
| Wash | 120 | 120 |
| Final Rinse | 10 | 10 |

The films were then read for Status M densitometry, and the results are shown in Table 4. "Fog" density equals the difference between the minimum density resulting from Process A and the minimum density resulting from Process B. The "fog" density is a measure of the density that develops with no exposure. Note the lower densities of the samples of this invention compared to those of the comparison samples.

TABLE 4

Mid-scale Contrast and Density Data.

| Sample | Blue MSC | Green MSC | Red MSC | Process A Blue Min Density | Process B Blue "CCD" Density | Blue "Fog" Density |
|---|---|---|---|---|---|---|
| 1A (comparison) | 0.62 | 0.66 | 0.54 | 0.898 | 0.643 | 0.255 |
| 1B (comparison) | 0.63 | 0.62 | 0.54 | 0.833 | 0.575 | 0.258 |

TABLE 4-continued

Mid-scale Contrast and Density Data.

| Sample | Blue MSC | Green MSC | Red MSC | Process A Blue Min Density | Process B Blue "CCD" Density | Blue "Fog" Density |
|---|---|---|---|---|---|---|
| 1C (invention) | 0.40 | 0.41 | 0.44 | 0.622 | 0.523 | 0.099 |
| 1D (invention) | 0.40 | 0.40 | 0.36 | 0.637 | 0.528 | 0.109 |

EXAMPLE 2

The following layers were coated on a transparent base to make film samples 2A through 2D, as described in Table 5. Emulsions and chemicals are the same as those described in Example 1. All samples were processed through Process A, as described in Example 1. Sensitometric data are shown in Table 6.

Table 7 contains Modulation Transfer Function (MTF) and granularity data. MTF data at 40 cycles per millimeter are shown, and are average values for the mid-scale exposure region. A fringe camera system was employed to measure the MTF data (*J. Applied Photogr. Eng.*, Vol 6, No 1, February 1980, pp 1–8). Granularity measurements were measured using Status M microdensitometry with a 48 micron circular aperture. Granularity root mean square deviation values (σ) were determined using standard root mean square calculations (*The Theory of the Photographic Process*, 4th ed.; T. H. James, Ed.; Macmillan Publishing Co.: New York, N.Y., 1977; Ch 21, p 619, eq 21.77) and are average values for the mid-scale exposure region (region C-to-D in FIG. 1).

Table 8 contains the color saturation and hue data from film-to-video transfers. Samples 2A through 2D were loaded into an Arri BL camera, and were exposed to a reflection target that contained various saturated color patches. The film samples were processed through Process A and were transferred to video using a Rank Model IIIC telecine device with a Rank Digi-IV analog-to-digital converter. A Pandora Pogel controller connected to the Rank telecine provided standard color grading capabilities. A Tektronix 1735 Waveform Monitor and a Tektronix 1725 Vectorscope were used to adjust the luminance and chrominance values in the transfer operation to render a high quality image. The video signal was recorded on a BTS DRC100 D-1 Recorder. A Tektronix VM700A Videomeasurement Device was used to quantify luminance voltage (IRE), chrominance voltage (IRE), and chrominance phase (degrees) of the colored patches in the images. Color saturation is quantified by the ratio of the chrominance voltage to the luminance voltage (*Color-TV Training Manual,* Howard Smith, Ed.; Howard W. Sams & Co., Inc.: Indianapolis, Ind., 1983; pp 41–43). A higher quotient indicates higher color saturation, which is preferred. Increased blue, red, and yellow saturation are found with the samples of this invention. Color hue is quantified by the chrominance phase in degrees. Aim hue angles for each color are shown (*The Electronic Cinema,* Harry Mathias, Wadworth publishing Co.: Belmont, Calif., 1985; p 120). Improvements in magenta hues are found with the samples of this invention.

TABLE 5

Formulation Description (Units are mg/m$^2$)

| | Sample | | | |
|---|---|---|---|---|
| | 2A | 2B | 2C | 2D |
| Layer 1 | | | | |
| Slow Cyan Emulsion | 484 | 436 | 339 | 371 |
| Mid Cyan Emulsion | 1129 | 1178 | 1275 | 1242 |
| Coupler-1 | 323 | 280 | 130 | 180 |
| Coupler-2 | 17 | 24 | 47 | 40 |
| Coupler-3 | 65 | 65 | 65 | 65 |
| Coupler-4 | 25 | 25 | 25 | 25 |
| Coupler-5 | 27 | 27 | 27 | 27 |
| Gelatin | 2535 | 2535 | 2535 | 2535 |
| Layer 2 | | | | |
| Fast Cyan Emulsion | 1100 | 1100 | 977 | 1017 |
| Coupler-1 | 81 | 61 | 5.4 | 24 |
| Coupler-5 | 27.0 | 27.0 | 27.0 | 27.0 |
| Gelatin | 1347 | 1347 | 1347 | 1347 |
| Layer 3 | | | | |
| Coupler-6 | 18 | 30 | 58 | 48 |
| Didodecylhydroquinone | 108 | 108 | 108 | 108 |
| Gelatin | 646 | 646 | 646 | 646 |
| Layer 4 | | | | |
| Slow Magenta Emulsion | 990 | 1187 | 1706 | 1533 |
| Mid Magenta Emulsion | 1483 | 1286 | 766 | 940 |
| Coupler-7 | 420 | 359 | 314 | 329 |
| Coupler-1 | 43 | 43 | 43 | 43 |
| Coupler-8 | 144 | 144 | 144 | 144 |
| Coupler-9 | 31 | 34 | 42.5 | 40 |
| Gelatin | 2277 | 2277 | 2277 | 2277 |
| Layer 5 | | | | |
| Fast Magenta Emulsion | 1119 | 1119 | 994 | 1035 |
| Coupler-8 | 21.5 | 21.5 | 21.5 | 21.5 |
| Coupler-10 | 84 | 71 | 26 | 42 |
| Coupler-7 | 118.4 | 118.4 | 118.4 | 118.4 |
| Gelatin | 1290 | 1290 | 1290 | 1290 |
| Layer 6 | | | | |
| Coupler-6 | 18.3 | 18.3 | 18.3 | 18.3 |
| Didodecylhydroquinone | 108 | 108 | 108 | 108 |
| Dye-1 | 151.0 | 151.0 | 151.0 | 151.0 |
| Gelatin | 646 | 646 | 646 | 646 |
| Layer 7 | | | | |
| Slow Yellow Emulsion | 255 | 280 | 239 | 253 |
| Mid Yellow Emulsion | 595 | 570 | 485 | 513 |
| Coupler-11 | 27 | 27 | 27 | 27 |
| Coupler-12 | 434 | 529 | 452 | 600 |
| Coupler-13 | 365 | 216 | 0.0 | 0.0 |
| Gelatin | 1700 | 1700 | 1700 | 1700 |
| Layer 8 | | | | |
| Fast Yellow Emulsion | 1700 | 1615 | 1360 | 1445 |
| Coupler-13 | 336 | 319 | 269 | 285 |
| Gelatin | 1641 | 1641 | 1641 | 1641 |

TABLE 6

Mid-scale Contrast Values.

| Sample | Blue MSC | Green MSC | Red MSC |
|---|---|---|---|
| 2A (comparison) | 0.61 | 0.64 | 0.53 |
| 2B (comparison) | 0.54 | 0.56 | 0.49 |
| 2C (invention) | 0.32 | 0.39 | 0.34 |
| 2D (invention) | 0.41 | 0.44 | 0.39 |

TABLE 7

MTF and Granularity Data.

| Sample | | 2A | 2B | 2C | 2D |
|---|---|---|---|---|---|
| MTF @ | Red | 36.0 | 34.3 | 37.0 | 43.5 |
| 40 C/mm | Green | 73.3 | 69.5 | 77.0 | 82.0 |
| | Blue | 90.0 | 83.3 | 89.0 | 98.0 |
| Granularity | Red | 10.3 | 8.9 | 6.6 | 6.7 |
| σ × 1000 | Green | 11.8 | 10.5 | 8.4 | 9.1 |
| | Blue | 30.9 | 29.9 | 26.1 | 27.2 |

TABLE 8

Color Data for Film-to-Video Transfers
(* = Improved with samples of this invention)

| Sample | | 2A | 2B | 2C | 2D | "Aim" |
|---|---|---|---|---|---|---|
| Luminance | Blue | 37.4 | 37.7 | 42.7 | 45.1 | |
| (IRE) | Cyan | 38.8 | 37.7 | 38.1 | 41.8 | |
| | Green | 28.2 | 25.6 | 26.7 | 28.6 | |
| | Magenta | 39.4 | 37.9 | 37.6 | 36.4 | |
| | Red | 64.9 | 63.7 | 68.5 | 61.5 | |
| | Yellow | 58.5 | 58.5 | 56.9 | 58.2 | |
| Chrominance | Blue | 37.4 | 37.7 | 42.7 | 45.1 | |
| (IRE) | Cyan | 38.8 | 37.7 | 38.1 | 41.8 | |
| | Green | 28.2 | 25.6 | 26.7 | 28.6 | |
| | Magenta | 39.4 | 37.9 | 37.6 | 36.4 | |
| | Red | 64.9 | 63.7 | 68.5 | 61.5 | |
| | Yellow | 58.5 | 58.5 | 56.9 | 58.2 | |
| Ratio | Blue(*) | 0.80 | 0.80 | 0.86 | 0.89 | max |
| Chrom/Lum | Cyan | 0.66 | 0.65 | 0.64 | 0.69 | max |
| | Green | 0.53 | 0.48 | 0.49 | 0.50 | max |
| | Magenta | 0.58 | 0.55 | 0.56 | 0.54 | max |
| | Red(*) | 1.17 | 1.16 | 1.35 | 1.22 | max |
| | Yellow(*) | 0.66 | 0.66 | 0.68 | 0.71 | max |
| Chrominance | Blue | 337.2 | 340.4 | 338.4 | 337.1 | 347 |
| (Deg) | Cyan | 297.2 | 301.1 | 305.1 | 305.8 | 284 |
| | Green | 258.8 | 260.9 | 252.4 | 259.9 | 241 |
| | Magenta(*) | 82.2 | 78.6 | 71.1 | 64.8 | 61 |
| | Red | 109.0 | 109.2 | 104.8 | 105.9 | 104 |
| | Yellow | 172.6 | 171.5 | 168.9 | 172.9 | 167 |

EXAMPLE 3

Samples 2A through 2D were exposed to a high dynamic range scene (500:1), processed through Process A, and then transferred to video on the telecine equipment described in Example 2. A dozen individuals were shown the resulting images and were asked to judge the quality of the highlight reproduction in this scene. They gave the results shown in Table 9. The samples of this invention always showed better highlight detail and were less apt to burn out in the telecine transfer process than the comparison samples.

TABLE 9

| | Highlight Transfer Quality | |
| --- | --- | --- |
| Sample | Description | Highlight Quality |
| 2A | comparison | Good |
| 2B | comparison | Good |
| 2C | invention | Excellent |
| 2D | invention | Excellent |

While the invention has been described in detail with particular reference to preferred embodiments, it will be understood that variations and modifications can be effected within the spirit and scope of the invention.

We claim:

1. An unexposed silver halide color negative photographic film comprising red, green and blue color sensitive silver halide records, wherein at least two of the color records has a mid-scale contrasts less than or equal to 0.40, wherein the mid-scale contrast for a color record is defined as the slope of a straight line connecting a point $\underline{C}$ and a point $\underline{D}$ on the characteristic curve of Status M density versus log Exposure for the color record, where points $\underline{C}$ and $\underline{D}$ are located by defining a point $\underline{A}$ on the characteristic curve at a density level 0.1 above minimum density, a point $\underline{B}$ is located on the characteristic curve at an exposure value +1.0 Log Exposure beyond point $\underline{A}$, and points $\underline{C}$ and $\underline{D}$ are located at exposure values −0.45 log Exposure and +0.45 log Exposure with respect to point $\underline{B}$, respectively.

2. An unexposed color negative photographic film according to claim 1 wherein each of the red, green and blue color records has a mid-scale contrast less than or equal to 0.45.

3. An unexposed color negative photographic film according to claim 1 wherein the blue color record has a mid-scale contrast less than or equal to 0.45.

4. An unexposed color negative photographic film according to claim 3 wherein the blue color record has a mid-scale contrast less than or equal to 0.40.

5. A process of forming a telecine transfer image comprising exposing a film according to claim 1, processing the exposed film to form a developed image, and converting the developed image into video signals representative of the developed image with a telecine transfer device, wherein the contrast of the video signals representative of the color records of the image having a mid-scale contrast less than or equal to 0.45 are raised in the telecine transfer device.

6. A process according to claim 5 wherein each of the red, green and blue color records of the film has a mid-scale contrast less than or equal to 0.45.

7. A process according to claim 5 wherein the blue color record of the film has a mid-scale contrast less than or equal to 0.45.

8. A process according to claim 7 wherein the blue color record has a mid-scale contrast less than or equal to 0.40.

9. An unexposed silver halide color negative photographic film comprising red, green and blue color sensitive silver halide records, wherein at least one of the color records has a mid have mid-scale contrasts less than or equal to 0.40, wherein the mid-scale contrast for a color record is defined as the slope of a straight line connecting a point C and a point D on the characteristic curve of Status M density versus log Exposure for the color record, where points C and D are located by defining a point A on the characteristic curve at a density level 0.1 above minimum density, a point B is located on the characteristic curve at an exposure value +1.0 Log Exposure beyond point A, and points C and D are located at exposure values −0.45 log Exposure and +0.45 log Exposure with respect to point B, respectively.

10. An unexposed color negative photographic film according to claim 9 wherein at least two of the color records has a mid-scale contrast less than or equal to 0.45.

11. An unexposed color negative photographic film according to claim 9 wherein each of the red, green and blue color records has a mid-scale contrast less than or equal to 0.45.

12. An unexposed color negative photographic film according to claim 9 wherein the blue color record has a mid-scale contrast less than or equal to 0.45.

13. An unexposed color negative photographic film according to claim 9 wherein the blue color record has a mid-scale contrast less than or equal to 0.40.

14. A process of forming a telecine transfer image comprising exposing a film according to claim 9, processing the exposed film to form a developed image, and converting the developed image into video signals representative of the developed image with a telecine transfer device, wherein the contrast of the video signals representative of the dolor record of the image having a mid-scale contrast less than or equal to 0.40 is raised in the telecine transfer device.

15. A process according to claim 14 wherein at least two of the color records of the film have mid-scale contrasts less than or equal to 0.45.

16. A process according to claim 14 wherein each of the red, green and blue color records of the film have a mid-scale contrasts less than or equal to 0.45.

17. A process according to claim 14 wherein the blue color record of the film has a mid-scale contrast less than or equal to 0.45.

18. A process according to claim 14 wherein the blue color record of the film has a mid-scale contrast less than or equal to 0.40.

* * * * *

UNITED STATES PATENT AND TRADEMARK OFFICE
CERTIFICATE OF CORRECTION

PATENT NO. : 5,576,128

DATED : November 19, 1996

INVENTOR(S) : John T. Keech, et al

It is certified that error appears in the above-identified patent and that said Letters Patent is hereby corrected as shown below:

Column 21, lines 28-29, delete "has a" and insert therefor --have--; delete "0.40" insert therefor --0.45--.

Column 22, line 11, delete "mid have", delete "contrasts" insert therefor --contrast--.

Column 22, line 42, delete "dolor" insert therefor --color--.

Signed and Sealed this

First Day of April, 1997

BRUCE LEHMAN

*Attest:*

*Attesting Officer*  *Commissioner of Patents and Trademarks*